(12) United States Patent
Montagne

(10) Patent No.: US 6,608,851 B2
(45) Date of Patent: Aug. 19, 2003

(54) LASER SOURCE

(75) Inventor: Jean-Eucher Montagne, Orleans (FR)

(73) Assignee: Compagnie Industrielle des Lasers Cilas, Marcoussis (FR)

( * ) Notice: Subject to any disclaimer, the term of this patent is extended or adjusted under 35 U.S.C. 154(b) by 0 days.

(21) Appl. No.: 10/012,537

(22) Filed: Dec. 12, 2001

(65) Prior Publication Data

US 2002/0114372 A1 Aug. 22, 2002

(30) Foreign Application Priority Data

Dec. 26, 2000 (FR) .............................. 00 17020

(51) Int. Cl.$^7$ .............................................. H01S 3/091
(52) U.S. Cl. .............................. 372/70; 372/92; 372/94
(58) Field of Search ............................. 372/75, 92, 94, 372/72, 6; 359/333

(56) References Cited

U.S. PATENT DOCUMENTS

| | | | | |
|---|---|---|---|---|
| 5,048,026 A | * | 9/1991 | Shaw et al. ..................... | 372/6 |
| 5,086,433 A | * | 2/1992 | Pocholle et al. ............... | 372/72 |
| 5,148,444 A | * | 9/1992 | Berger .......................... | 372/94 |
| 5,651,021 A | * | 7/1997 | Richard et al. ................ | 372/92 |
| 6,002,704 A | * | 12/1999 | Freitag et al. ................. | 372/94 |
| 6,288,833 B1 | * | 9/2001 | Kasamatsu .................... | 359/333 |

FOREIGN PATENT DOCUMENTS

EP    0404635    12/1990

OTHER PUBLICATIONS

Patent Abstracts of Japan, vol. 018, No. 035 (E–1494), Jan. 19, 1994 & JP 05 267750 A (Mitsubishi Electric Corp), Oct. 15, 1993.
Patent Abstracts of Japan, vol. 017, No. 378 (E–1398, Jul. 15, 1993 & JP 05 063263 A (Hoya Corp), Mar. 12, 1993.
Honea E C et al., "183–W, M2=2.4 YB: YAG Q–Switched Laser", Optics Letters, Optical Society of America, Washington, US. vol. 24, No. 3, pp. 154–156, Feb. 1, 1999.
French Search Report dated Aug. 30, 2001.

* cited by examiner

*Primary Examiner*—Paul Ip
*Assistant Examiner*—Hung Vy

(57) ABSTRACT

A laser source (1) includes a pumping system (2) and an active element (3) which comprises a doped elongate rod (4) and at least one optical block (5, 6) for guiding the pump rays (F) of at least one pump beam toward the rod (4). The pumping system (2) generates a number of parallel pump rays (F). The entry face (5A, 6A) of the optical block (5, 6) is inclined to the longitudinal axis (X—X) of the rod (4) and is not orthogonal to the pump rays (F) in order to deflect the pump rays (F) by refraction so as to transmit them toward the rod (4), and the inclination of the entry face (5A, 6A) is such that the pump rays (F) reach the bar (4) so as to be distributed over its entire length.

9 Claims, 2 Drawing Sheets

LASER SOURCE

The present invention relates to a laser source.

BACKGROUND

It is known that a laser source comprises, in general, at least:
- an active element comprising at least one doped rod, in which a stimulated amplification (laser) phenomenon takes place;
- a pumping system generating at least one pump beam, which is emitted into said active element so as to provide the energy needed for said laser amplification; and
- an optical cavity which gives the laser beam obtained by this laser application its directivity and geometrical characteristics.

To obtain satisfactory pumping, it is known that it is necessary for the latter to have a high yield and to be highly uniform (over the doped rod of the active element), particularly in the case of a three-level laser.

With regard to the arrangement of the pumping system, a first type of pumping is known, called transverse pumping, which consists in placing said pumping system, generally a laser diode, orthogonally to the rod to be pumped. In this case, as long as the rod is not too long, it is possible to obtain good uniformity along the longitudinal axis of the latter. However, the yield is often low. Furthermore, when the rod is longer than the pumping system, it is necessary to provide an optical system to make the pumping uniform. Such an optical system is generally very bulky. Despite everything, the yield also remains low.

To increase the yield, it is possible to use a second type of pumping, called longitudinal pumping, which consists in placing the pumping system along the axis of the laser rod. In this case, although the yield may be very high, the uniformity is reduced since it is difficult to pump that end of the rod which is remote from the pumping system.

Furthermore, to make the pattern of pump energy symmetrical, it is general practice to inject the pump beams emitted by laser diodes into an optical fiber. At the fiber exit, the near-field and far-field profiles are circular, this being favorable to pumping. However, fiber-coupled laser diodes of this type are very expensive. In addition, the energy deposition obtained decreases strongly between the entry face, where the pump beams enter the rod, and the exit face. This reduces the yield.

The present invention relates to a laser source which makes it possible to remedy these drawbacks, that is to say a laser source whose pumping has both a high yield and high uniformity.

Document EP-0 404 635 discloses an illumination structure for a rod laser, having delocalized optical sources, enabling efficient removal of the thermal energy generated by the optical pumping sources, while still obtaining satisfactory uniformity of pumping. To do this, the optical sources are placed on the same delocalized support, which is provided with a heat sink, and the illumination structure includes an optical transfer system for transferring the pump beam to the rod. This optical transfer system consists of reflecting means which send the pump beam toward the rod.

However, this known illumination structure is relatively bulky and the yield is not optimal.

SUMMARY

It is an object of the present invention to remedy these drawbacks. It relates to a compact laser source, the pumping of which is, in particular, highly uniform and has a high yield.

For this purpose, according to the invention, said laser source of the type comprising at least:
- a pumping system (2) for generating at least one pump beam; and
- an active element which comprises an elongate rod provided with a doped matrix capable of absorbing pump rays of said pump beam in order to amplify the laser radiation and at least one optical block placed on one side of said rod in order to guide the pump rays toward said rod, is noteworthy in that said pumping system is formed so as to generate a plurality of pump rays which are mutually parallel and distributed transversely to said active element, facing at least one entry face of said optical block, in that said entry face of the optical block is, at least partly, inclined with respect to the longitudinal axis of said rod and is, at least partly, non-orthogonal to the pump rays generated by the pumping system in order to deflect, by refraction, said pump rays so as to transmit them toward said rod and in that the inclination of said entry face is such that it deflects the pump rays in such a way that these rays reach said rod so that they are distributed over its entire length.

Thus, by virtue of the invention, the pump rays are uniformly distributed over the entire length of the rod in such a way that the pumping is particularly uniform.

In addition, the deflection of the pump rays is achieved by simple refraction. Consequently, it is unnecessary, in order to achieve this deflection, to provide specific means, such as reflection means for example, which are sometimes bulky and which require additional, often expensive and time-consuming treatments.

It should also be noted that, according to the invention, the entry of the pump rays into the optical block is different from the usual practice, whereby the pump rays are emitted orthogonally to the entry face of the optical block.

Preferably, said active element comprises two optical blocks which are placed on each side of said rod and are each provided with an inclined entry face in such a way that the pumping of the rod is carried out on both sides. In addition, this pumping is identical on both sides if the active element and the pumping system are symmetrical with respect to the longitudinal axis of said rod.

Thus, by virtue of these additional features, the pumping is uniform not only over the entire length of the rod, but also (everywhere) throughout its thickness.

It is known in fact that the pump energy is in general highly absorbed over a short distance of penetration into the rod so that that part of the rod lying on the opposite side from the region of penetration of the pump beam into said rod is usually weakly pumped. By virtue of the aforementioned pumping along both sides, this drawback is remedied and the pumping is made uniform over the entire rod (even if the center of the rod is, nevertheless, slightly less pumped than its edges).

Furthermore, by virtue of the invention, the pump rays necessarily pass through the rod, thereby making it possible to obtain a high yield.

Advantageously:
- the pumping system comprises at least one linear array of laser diodes; and
- said pump rays are generated parallel to the longitudinal axis of said rod by said pump system.

In addition, advantageously, the inclination of each entry face depends on the length L of the rod and on the refractive index n of the medium forming the optical block with respect to the medium in which the pump rays are generated.

More precisely, in an advantageous manner, the angle of inclination (θ) between the inclined entry face and the longitudinal axis of the rod approximately satisfies the following equation:

$$\cos\theta = n.\cos(\theta + \arctan(H/L))$$

in which:

cosθ represent the cosine of θ;

arctan(H/L) represents the inverse tangent of H/L; and

H is the width of the optical block orthogonal to the longitudinal axis of said rod at the entry face.

Moreover, in one particular embodiment, each optical block has, on the opposite side from its entry face, a second inclined face and the inclinations of said second faces are such that they cause the pump rays to return (toward the entry faced), generating at least one additional pass through said rod. Thus, the number of passes through the rod is increased for the same pump ray, thereby increasing the efficiency of the pumping.

Furthermore, in an advantageous manner, the rod has a rectangular cross section, the two adjacent sides of which define the width and the height of the rod respectively, said height corresponds to the height of the active element, the width of the active element comprises said width of said rod and the widths of the optical blocks and the height of the active element is less than twice the width of the rod. By virtue of this reduced height of the active element (between an upper face and a lower face) compared with its width, it is possible to guide the pump rays, making them be reflected off said upper and lower faces. This makes it possible to define a short guide path and thus rapid guiding.

Moreover, with regard to the refractive index, the index of each optical block is advantageously less than the index of the rod. Thus, the pump rays are prevented from being reflected by the rod, instead of passing through it.

BRIEF DESCRIPTION OF THE DRAWINGS

The figures of the appended drawing will make it clearly understood how the invention can be realized. In this figures, identical reference numbers denote similar elements.

Figure 1:
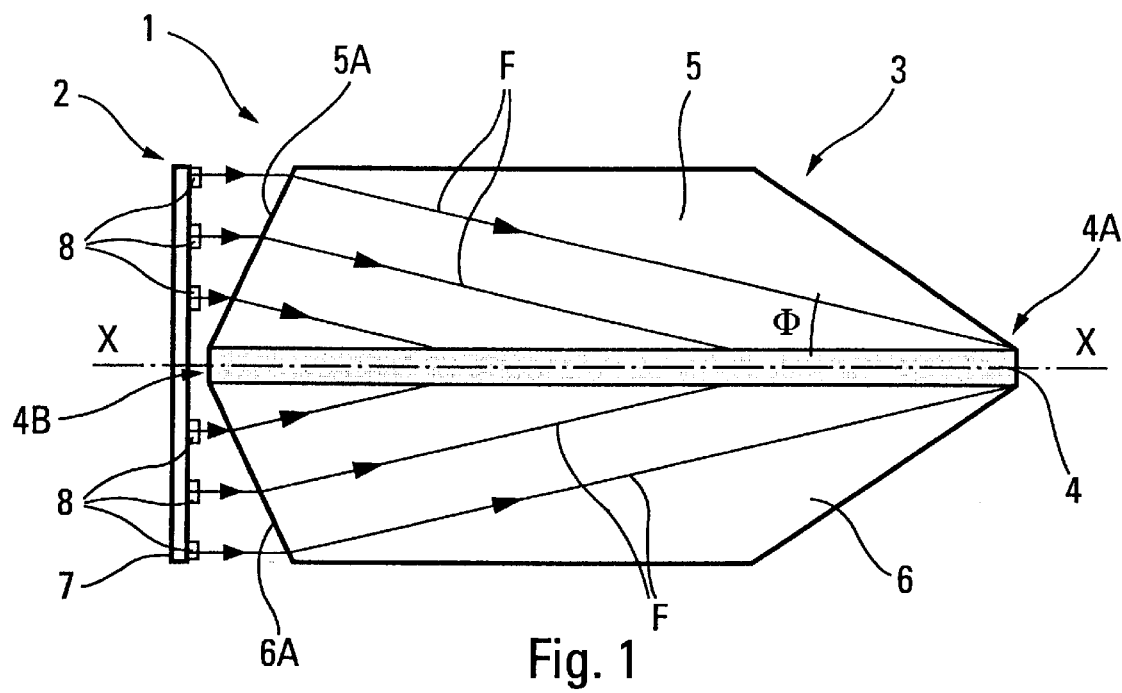
FIG. 1 shows schematically a laser source according to the invention.

The laser source 1 according to the invention, shown schematically and partially in FIG. 1, comprises, in a known manner:

a pumping system 2, explained in detail below, for generating at least one pump beam formed from pump rays F;

an active element 3 which comprises:

an elongate rod 4 of axis X—X, having a rectangular cross section, which is provided with a usual doped matrix (for example with erbium-ytterbium doping) in order to amplify a laser beam upon receiving pump beams F and two optical blocks (5, 6), for example made of glass, yttrium aluminum garnet (YAG) or yttrium vanadate, which are fixed together, in particular by bonding, on each side of said rod 4 in order to guide the pump rays F toward the latter; and a known optical cavity, not shown, which confers on the laser beam its directivity and geometrical characteristics.

DESCRIPTION OF THE INVENTION

Figure 2:
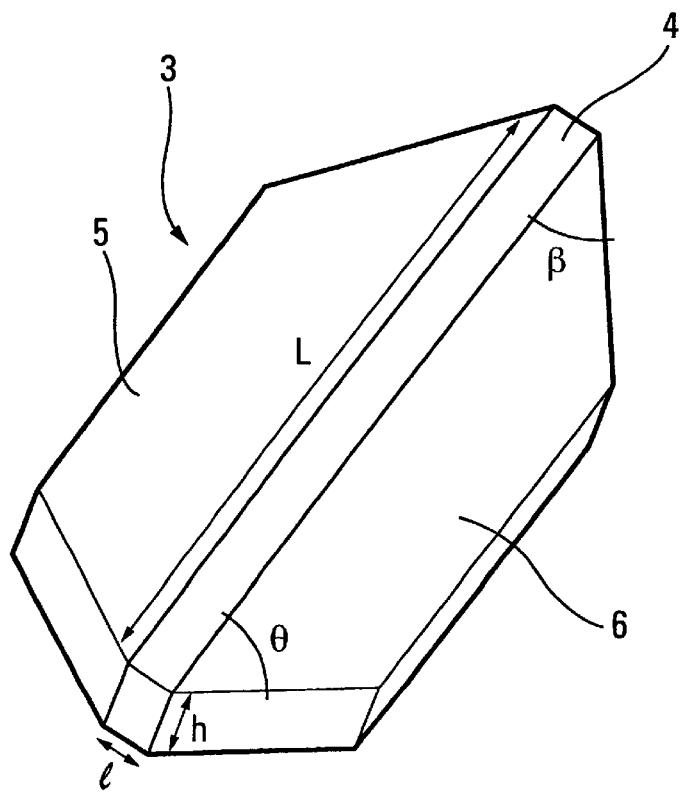
FIG. 2 shows, in schematic perspective, an active element according to the invention.

According to the invention:

said pumping system 2 is formed so as to generate a plurality of pump rays F (of at least one pump beam) which are mutually parallel and distributed (uniformly) transversely to said active element 3, facing the entry face 5A, 6A of each of the optical blocks 5 and 6;

the entry face 5A and 6A of each of said optical blocks 5 and 6 is inclined at an angle θ to the longitudinal axis X—X of the rod 4, which angle θ is different from 90° (FIG. 2);

the pump rays F are generated so as not to be orthogonal to the corresponding entry face 5A, 6A in order to be deflected by refractions; and the inclination (angle θ) of each entry face 5A, 6A is such that it deflects the pump rays F which pass through it in such a way that the latter reach said rod 4 so as to be uniformly distributed over its entire length L, as shown in FIG. 1.

Thus, by virtue of the invention:

the pump rays F are uniformly distributed over the entire length L of the rod 4; and the pumping is carried out identically on both sides of the rod 4 in such a way that the pumping is particularly uniform and has a high yield.

In addition, the pump rays F are deflected on the entry faces 5A, 6A by simple refraction, without additional means, in particular without reflection means. Such a solution is simple, compact and inexpensive.

Said pumping system 2 comprises a linear array 7 provided with a plurality of laser diodes 8, for example an array emitting 100 W for 5 ms and having an emitting area of 10 mm×1 μm, provided with twenty-five elementary laser diodes.

The laser diodes 8 are uniformly distributed along the array 7 for those parts of the array which face the entry faces 5A and 6A, so as to obtain the desired uniform distribution of the pump rays F emitted.

Preferably, although not exclusively, the pump rays F, which are mutually parallel, are emitted parallel to the longitudinal axis X—X.

However, it should be noted that the present invention may also be implemented if the pump rays are emitted so as to be inclined (slightly) to the axis X—X. It is then sufficient to modify the angle θ of the entry face 5A, 6A in order to obtain the aforementioned uniform distribution of the pumping in accordance with the invention.

The entry face 5A, 6A is preferably plane. However, it may also be slightly curved (the angle of inclination then not being constant, but varying slightly.

Consequently, to implement the present invention it is possible to use standard low-cost laser diodes 8. In particular, it is not necessary to use expensive fiber-coupled laser diodes.

According to the invention, the angle of inclination θ of each entry face 5A, 6A depends on the length L of the rod 4 and on the refractive index n of the medium (glass, for example) forming the optical block 5, 6 with respect to the medium (the external air, for example) in which the pump rays F travel before reaching the corresponding entry face 5A, 6A.

More precisely, according to the invention, said angle of inclination θ approximately satisfies the following equation:

$$\cos\theta = n \cdot \cos(\theta + \arctan(H/L)) \quad (1)$$

in which:

cosθ represents the cosine of θ;

arctan (H/L) represents the inverse tangent of H/L; and

Figure 3:
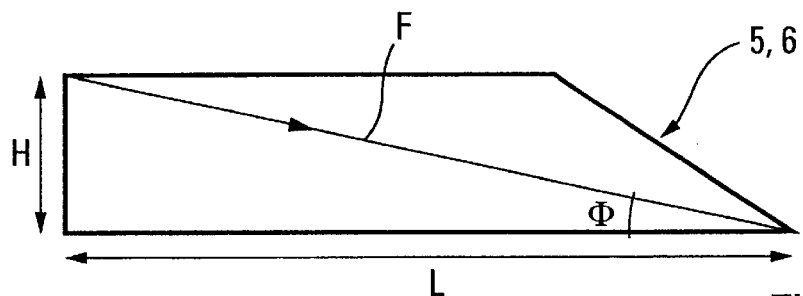
FIGS. 3 and 4 are diagrams for explaining the calculation of the various dimensions of an active element according to the invention.

H is the width of an optical block (5, 6) orthogonal to the longitudinal axis (X—X) of the rod (4) at the entry face (5A, 6A), as shown in FIG. 3 (which is a schematic explanatory representation without an inclined entry face).

To explain the aforementioned equation (1) further, the angle φ is taken as that corresponding to the angle between the axis X—X and an extreme deflected pump ray F, allowing the rod 4 to be pumped at the end 4A on the opposite side from that 4B facing the pumping system 2.

This angle φ approximately satisfies the equation (FIG. 3):

$$\phi = \arctan(H/L) \quad (2)$$

Figure 4:
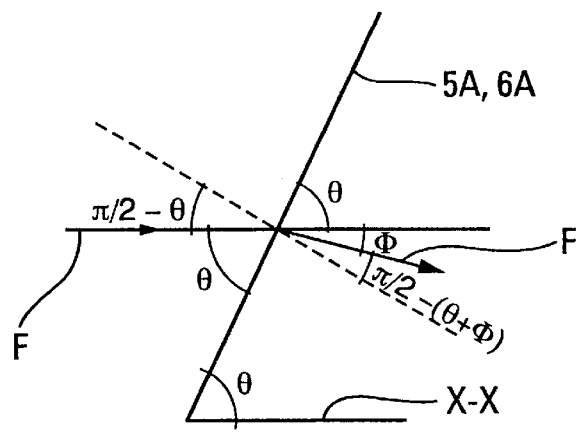

In addition, the law of refraction for a ray passing through an entry face 5A, 6A may be written as (see FIG. 4):

$$\sin\left(\frac{\pi}{2} - \theta\right) = n \cdot \sin\left(\frac{\pi}{2} - (\Theta + \theta)\right)$$

that is:

$$\cos\theta = n \cdot \cos(\theta + \phi) \quad (3)$$

The aforementioned equation (1) is obtained from said equations (2) and (3).

With regard to the actual dimensions of the active element 3 for one particular example of the laser source 1, the desired yield, the energy characteristics of the pump beam(s) and the pumping characteristics of the rod 4 should in particular be taken into account.

It should be noted that the length L of the rod 4 can be obtained from the following equation:

$$L = \frac{\text{Ln}(\sqrt{G})}{g_o},$$

in which:

Ln responds to the natural logarithm;

G represents the gain for one round trip; and $g_o$ represents the small signal gain.

As an example, using the following values which give a deposition density of about 12 J/cm³ on average:

G=1.8

$g_o$=0.11 cm$^{-1}$

The length L takes the value:

L=25 mm

As regards the width H, this is defined according to the length ltot of the array 7 of laser diodes 8, that is to say approximately:

$$ltot = 2H + l,$$

l being the width of the rod 4.

The value of the width H is therefore obtained from the equation:

$$H = (ltot - l)/2.$$

It should be noted that, in practice, the width of the active element is greater than ltot in order to take the divergence of the array and the positional tolerances into account. The total width of the active element then becomes $$\text{width} = 2H + l + 2\epsilon,$$

ε being the sum of half the broadening of the beam of the entry face and of half the tolerance of the relative positioning of the active element with respect to the laser diodes.

As regards the angle θ, this is obtained from the aforementioned equation (1), using the values of the parameters H and L thus determined.

With regard to the width l of the rod 4, use is made of a known law for transmission through an absorbent medium, written as:

$$2e^{\frac{-\alpha l}{2\sin\theta}} = X$$

where α is the absorption coefficient of the medium and X is the expected percentage of pump energy at the center of the rod 4 with respect to the energy arriving at the surface.

This law allows the width l to be determined.

In addition, the height h is defined from this width l, from the length L and from the volume v $$(v = l \times h \times L)$$

of the rod 4 (FIG. 2), which is needed to obtain the desired average energy deposition, according to the energy of the pump beam or beams.

Thus, to obtain for example an average deposition of 12 J/cm³ with a laser diode 8 emitting 0.5 J per full-power pulse, of which about 0.45 J is useful energy, the volume v of the rod 4 must be approximately:

$$v = 0.45/12 = 0.0375 \text{ cm}^3 = 37.5 \text{ mm}^3.$$

It should be noted that, in a preferred embodiment, the active element 3 has the following dimensions:

L=25.7 mm

φ=12.5°

θ=57.3° l=1.1 mm h=1.3 mm

Since the rod 4 lies over the entire height h of the active element 3 (FIG. 2), the pump rays F necessarily pass through said rod 4 (and do not perform, as in certain known types of active element, a number of reflections off the faces of the active element, which result in losses, before finally passing through the rod). This allows a high yield to be obtained.

Figure 5:
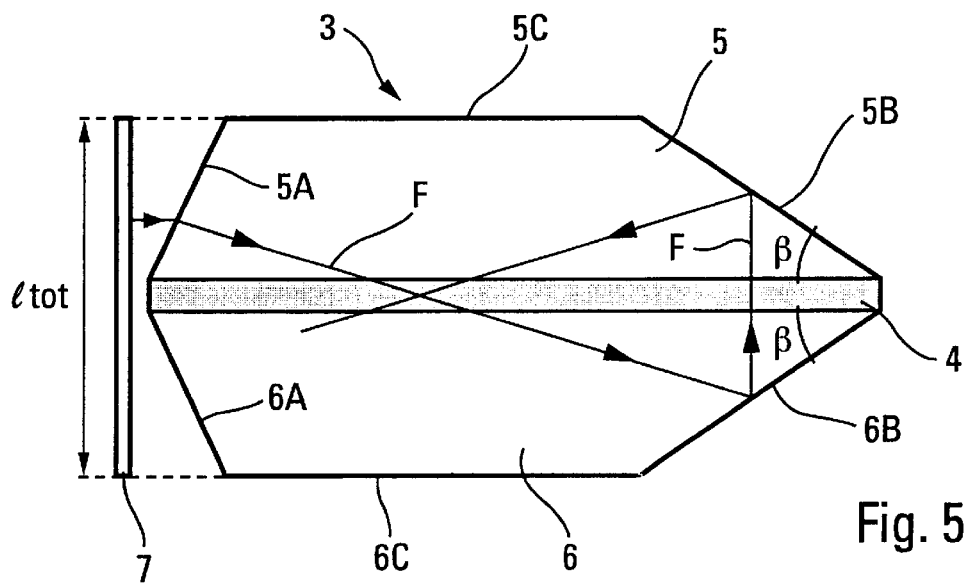
FIGS. 5 and 6 are two schematic views, a plan view and a side view respectively, of an active element according to the invention.

Moreover, according to the invention, the optical blocks 5 and 6 are symmetrical with respect to the axis X—X and each of said optical blocks 5, 6 has, on the opposite side from its entry face 5A, 6A, a second face 5B, 6B which is inclined to the axis X—X. The inclinations β of said second faces 5B, 6B are chosen, in the usual manner, in such a way that they cause the pump rays to return toward the entry faces 5A, 6A, as shown for a single ray F in FIG. 5. In the aforementioned preferred example, the angle β is approximately equal to 38.750.

This makes it possible to increase the number of passes by the pump rays F through the rod 4 and thus increase the efficiency of the pumping and therefore the efficiency of the laser source 1.

The inclined faces 5A and 5B, 6A and 6B of an optical block 5, 6 are joined to a face 5C, 6C which is parallel to the axis X—X.

Figure 6:
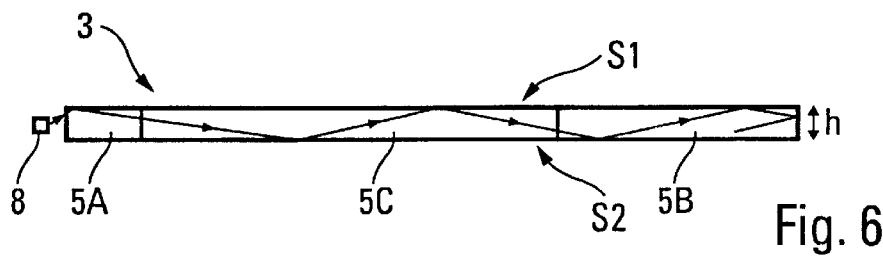

In addition, according to the invention, the height h (which corresponds, as may be seen in FIG. 2, both to the height of the rod 4 and to that of the optical blocks 5 and 6) is less than twice the width l and, preferably, is close to that of said width l, as illustrated previously in the numerical example. As a consequence, the height h of the active element 3 is much less than its total width tot. Thus, in order to reduce the length of the path of a pump ray F, it is guided, according to the invention, along the rapid axis throughout its propagation, that is to say with reflections off the upper face S1 and lower face S2 of the active element 3, as shown in FIG. 6, which corresponds to a top view of FIG. 5.

Moreover, it should be noted that:

the materials of the optical blocks 5 and 6 and of the rod 4 must preferably have expansion coefficients which are sufficiently similar to allow an effective bond to be produced between these materials; and with regard to the indices of these materials, in order to prevent a reflection of a pump ray F off the rod 4, it is preferable to use a material having a lower index for the optical blocks 5 and 6. However, since the pump rays F are always relatively far from the rod, the index of the optical blocks 5 and 6 may be greater by 0.01 without thereby impeding the pump rays F inclined by more than 7°.

As a consequence, the present invention has in particular the following advantages:

good longitudinal and depth-wise uniformity of the pumping (between 8.5 and 13 J/cm$^3$ in the case of the aforementioned example);

direct pumping, without fiber-coupled laser diodes, even for a small-diameter rod 4;

pumping by means of a simple array 7, without any optical collimation means, while pumping an active volume (rod 4) which is extended in length (25 mm for example) and reduced in diameter (1 mm for example); and a high yield (approximately 90°) and good uniformity, whatever the operating temperature and the material (glass) used.

What is claimed is:

1. A laser source comprising at least:

a pumping system for generating at least one pump beam; and an active element which comprises an elongate rod provided with a doped matrix capable of absorbing pump rays of said pump beam in order to amplify a laser radiation and at least one optical block placed on one side of said rod in order to guide the pump rays toward said rod, wherein:

said pumping system is formed so as to generate a plurality of said pump rays which are mutually parallel and distributed transversely to said active element, facing at least one entry face of said at least one optical block, said entry face of the at least one optical block is, at least partly, inclined with respect to the longitudinal axis (X—X) of said rod and is, at least partly, non-orthogonal to the pump rays generated by and received from the pumping system in order to deflect, by refraction, said pump rays so as to transmit them into toward said rod, and the inclination (θ) of said entry face is such that it deflects the pump rays received from the pumping system in such a way that these rays reach said rod so that they are distributed over its entire length (L).

2. A laser source according to claim 1, wherein said at least one optical block comprises two optical blocks which are placed on each side of said rod and are each provided with a said inclined entry face.

3. A laser source according to claim 1, wherein said pumping system comprises at least one linear array of laser diodes.

4. A laser source according to claim 1, wherein said pump rays are generated parallel to the longitudinal axis (X—X) of said rod.

5. A laser source according to claim 1, wherein the inclination (θ) of each said entry face depends on the length (L) of the rod and on the refractive index n of the medium forming the at least one optical block with respect to the medium in which the pump rays are generated.

6. A laser source according to claim 5, wherein the angle of inclination (θ) between the inclined entry face and the longitudinal axis (X—X) of the rod approximately satisfies the following equation:

$$\cos\theta = n \cdot \cos(\theta = \arctan(H/L))$$

in which:
    cosθ represents the cosine of θ;
    arctan (H/L) represents the inverse tangent of H/L; and
    H is the width of the at least one optical block orthogonal to the longitudinal axis (X—X) of said rod at the entry face.

7. A laser source according to claim 2, wherein each said at least one optical block has, on the opposite side from its entry face, a second inclined face and in that the inclinations (β) of said second inclined faces are such that they cause the pump rays to return, generating at least one additional pass through said rod.

8. A laser source according to claim 2, wherein the rod has a rectangular cross section, the two adjacent sides of which define the width (l) and the height (h) of the rod respectively, in that said height (h) corresponds to the height of the active element, in that the width (etot) of the active element comprises said width (t) of said rod and the widths (H) of the optical blocks and in that the height (h) of the active element is less than twice the width (l) of the rod.

9. A laser source according to claim 1, wherein the index of the at least one optical block is less than the index of the rod.

* * * * *